United States Patent
Saarinen et al.

(10) Patent No.: US 8,568,022 B2
(45) Date of Patent: Oct. 29, 2013

(54) METHOD AND ARRANGEMENT FOR MEASURING AT LEAST ONE PHYSICAL MAGNITUDE, SUCH AS TEMPERATURE, FLOW OR PRESSURE OF THE COOLING FLUID FLOWING IN AN INDIVIDUAL COOLING ELEMENT CIRCUIT OF A COOLING ELEMENT IN A METALLURGICAL FURNACE

(75) Inventors: Risto Saarinen, Espoo (FI); Lauri Pesonen, Helsinki (FI)

(73) Assignee: Outotec Oyj, Espoo (FI)

( * ) Notice: Subject to any disclaimer, the term of this patent is extended or adjusted under 35 U.S.C. 154(b) by 417 days.

(21) Appl. No.: 12/866,729

(22) PCT Filed: Feb. 4, 2009

(86) PCT No.: PCT/FI2009/050091
§ 371 (c)(1),
(2), (4) Date: Aug. 17, 2010

(87) PCT Pub. No.: WO2009/101246
PCT Pub. Date: Aug. 20, 2009

(65) Prior Publication Data
US 2010/0329300 A1    Dec. 30, 2010

(30) Foreign Application Priority Data
Feb. 11, 2008    (FI) ........................... 20085120

(51) Int. Cl.
*G01N 25/00*   (2006.01)
*G01K 13/00*   (2006.01)
*G01K 3/00*    (2006.01)
*G01K 7/00*    (2006.01)

(52) U.S. Cl.
USPC ............. 374/45; 374/143; 374/148; 374/141; 374/112; 374/166

(58) Field of Classification Search
USPC ................. 374/45, 141, 143, 148, 112, 166
See application file for complete search history.

(56) References Cited

U.S. PATENT DOCUMENTS

| | | | | |
|---|---|---|---|---|
| 2,209,075 A | * | 7/1940 | Davis | 136/213 |
| 3,366,163 A | * | 1/1968 | Scharbrough | 165/300 |
| 3,921,452 A | * | 11/1975 | Sartorius | 374/179 |

(Continued)

FOREIGN PATENT DOCUMENTS

WO    0248406 A1    6/2002

OTHER PUBLICATIONS

Translation of WO 02/48406 to Wurth (Jun. 20, 2002).*

(Continued)

*Primary Examiner* — Mirrellys Jagan
(74) *Attorney, Agent, or Firm* — Chernoff Vilhauer McClung & Stenzel LLP

(57) ABSTRACT

The invention relates to a method and arrangement for measuring at least one physical magnitude, such as temperature, flow or pressure of the cooling fluid flowing in an individual cooling element cycle (3) of a cooling element (1) in a metallurgical furnace. The arrangement includes a supply header (2) for distributing the cooling fluid and for feeding it to the cooling element cycles (3) of the cooling elements (1), and a collection header (4) for collecting and receiving cooling fluid from the cooling element cycles (3) of the cooling elements (1). The arrangement includes a survey line (5) that is by intermediation of a valve arrangement (6) in fluid connection with at least one cooling element cycle (3), so that the cooling fluid is conducted alternatively through the survey line (5) to the collection header (4) or past the survey line (5) to the collection header (4). The survey line (5) comprises at least one measuring device (7) for measuring at least one physical magnitude of the cooling fluid flowing in the survey line (5), and for measuring the cooling element cycle (3).

26 Claims, 2 Drawing Sheets

(56) References Cited

U.S. PATENT DOCUMENTS

Figure 1:
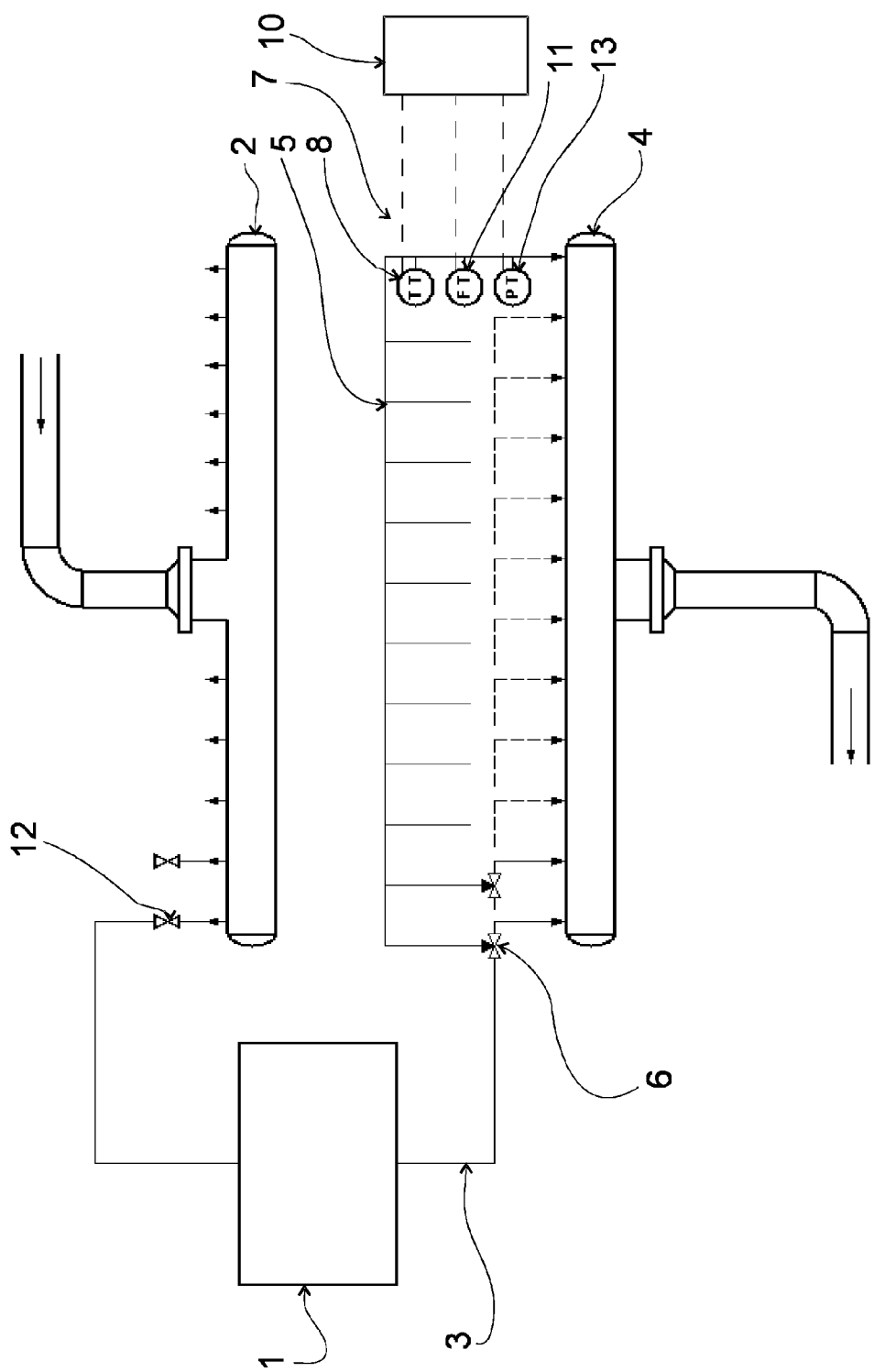

2003/0106673 A1   6/2003  Ly
2012/0017625 A1*  1/2012  Kroliczek et al. .............. 62/335

OTHER PUBLICATIONS

Kenneth Gustafsson, International Search Report for PCT/FI2009/050091, May 12, 2009.

* cited by examiner

METHOD AND ARRANGEMENT FOR MEASURING AT LEAST ONE PHYSICAL MAGNITUDE, SUCH AS TEMPERATURE, FLOW OR PRESSURE OF THE COOLING FLUID FLOWING IN AN INDIVIDUAL COOLING ELEMENT CIRCUIT OF A COOLING ELEMENT IN A METALLURGICAL FURNACE

This is a national stage application filed under 35 USC 371 based on International Application No. PCT/FI2009/050091 filed Feb. 4, 2009 and claims priority under 35 USC 119 of Finnish Patent Application No. 20085120 filed Feb. 11, 2008.

BACKGROUND OF THE INVENTION

The invention relates to a method for measuring at least one physical magnitude, such as temperature, flow or pressure of the cooling fluid flowing in an individual cooling element circuit of a cooling element in a metallurgical furnace.

The invention also relates to an arrangement for measuring at least one physical magnitude, such as temperature, flow or pressure of the cooling fluid flowing in an individual cooling element circuit of a cooling element in a metallurgical furnace.

The invention deals with cooling in a liquid metallurgical process, in a metallurgical furnace such as a suspension smelting furnace, for example a flash smelting furnace, by a cooling system including several supply headers for distributing cooling fluid, such as cooling water, to the cooling element circuits of the cooling elements used for cooling a metallurgical furnace, said system also including several collection headers for collecting said cooling element cycles together. From one supply header, there is usually fed cooling fluid to the cooling element cycles of 10-20 separate cooling elements. One metallurgical furnace can include tens of such header units comprising a supply header and a collection header.

Liquid metallurgical processes create in the stationary structures surrounding the reaction space thermal stresses that fluctuate both locationwise and timewise. Owing to the combined effect of these stresses, an unbalanced temperature distribution is formed in the refractory lining structure, which phenomenon is undesirable for the total durability of the lining. The regular method in furnace cooling is to focus the cooling power in those areas of the furnace where the thermal stress caused by metallurgical reactions is high. For example in a flash smelting furnace, these areas are located in the lower part of the reaction shaft, as well as the settler walls and tap holes. The spreading and sizing the cooling power is based on theoretical calculations, modeling and experiences obtained from other similar furnaces. After the design step, the installed cooling elements used for cooling the lining are static coolers and do not actively react to the changes that take place in the process.

A time-bound balancing of the cooling process, together with balancing the thermal stress caused by the process, is achieved by controlling the rates of flow of the cooling water that carries the thermal energy away. Owing to local differences in the thermal stress, it is not sufficient to adjust the rates of flow header by header, but in order to ensure a balanced cooling area, it is necessary to manipulate individual element cycles, i.e. the cooling element cycles of individual cooling elements. Before manipulating the rates of flow, it is necessary to know the heat loss of each cooling element, but earlier the measuring thereof has been very expensive owing to the fact that each cooling element cycle has been provided with a an individual meter and cabling. Therefore said cost item has generally been totally left out of the overall investment and mere header specific measurement has been considered sufficient.

In case the heat loss transferred from the element by each cycle should be defined, it is necessary to know the cycle-specific temperature difference between the incoming and outflowing cooling water, as well as the rate of flow. The adding of a heat and flow meter in every cycle is, however, unnecessary, because the momentary return temperature and flow rate of each cooling element in the cycle does not represent very vital information for the process control. It is, however, needed for accurately defining the cooling element specific heat loss, but it suffices when the values are obtained a few times per hour, or when the degree of throttle in the supply water control valve is changed. Therefore a simultaneous measuring of all cycles is unnecessary, and the measuring operations can be carried out one at a time.

BRIEF DESCRIPTION OF THE INVENTION

The object of the invention is to realize a method and arrangement for solving the above described problem.

The arrangement according to the invention has a survey line, which is by intermediation of a valve arrangement, such as a three-way valve, in fluid connection with at least one cooling element circuit, so that cooling fluid is conducted from the supply header in the cooling element cycle to the collection header, alternatively either through the survey line to the collection header or past the survey line to the collection header. The survey line comprises at least one measuring device such as a heat, pressure or flow meter for measuring a physical magnitude of the cooling fluid flowing in the survey line, such as the temperature, pressure or flow of the cooling fluid.

When said measuring tube is connected by a valve arrangement to all cooling element cycles between the supply header and the collection header, each cooling element cycle can by means of a valve arrangement be easily connected individually to a measuring tube. The obtained benefit is that per each header, there is only needed one heat, pressure and/or flow meter, by means of which all cycles can be measured in order. In practice, this enables a cost-effective way for defining the cooling element specific heat loss. In addition, by means of a pressure indicator, the appearance of possible leakages can be detected, as well as the development of flow resistance of the tubes. Another way to observe possible leakages is to compare, by means of a flow meter, the rates of flow of individual cycles with the total flow entering the supply header.

The arrangement can be automatized, so that an automation system takes care of regularly measuring each cycle at certain intervals. For example in a collection header with 20 cycles, when measuring in one-minute periods, from each cycle there are obtained 72 measurement results within 24 hours. In the case of a flash smelting furnace, the number of individual cycles can be even up to 800, in which case the total data quantity would be 57600 heat loss readings per 24 hours. This is a remarkable improvement in measurement accuracy in comparison with the earlier situation, where only the total flow entering the supply header was measured along with the overall temperature of the total outflow of the collection headers.

Element cycle specific data can be fed in a computer program that shows the local thermal stresses created by the process, furnace sector per sector, as a graph on a display for the operators. In addition to visualization, the program can be extended to analyze the situation and to make balancing flow changes, which are forwarded as commands to the furnace cooling control system. Flow changes can be realized by means of automatized active adjusting valves of the supply cycles of the supply header.

As a whole, the advantages achieved because of the dynamic nature of the system are numerous.

A balanced cooling area is achieved in between the different spots of the inner surface of the metallurgical furnace, because information is obtained on the cooling element level.

The wearing of the cooling elements can be slowed down, and the damaging thereof prevented, because information is obtained on the cooling element level, and cooling can be boosted in those locations, i.e. cooling elements, where the thermal stress is high, by increasing the flow of the cooling fluid. Because information is obtained on the cooling element level, a solution according to the invention makes it easier to anticipate problematic situations and enhances a safe operation and usage of the metallurgical furnace.

Because information is obtained on the cooling element level, water consumption can be optimized by focusing and/ or by increasing the flow of the cooling fluid in those cooling elements where more cooling is needed, and it is not necessary to increase the flow of the cooling fluid in the whole system between the supply header and the collection header.

Another advantage is also achieved by means of the solution according to the invention. It is known that a high temperature in a cooling element vaporizes the cooling fluid in the cooling element cycle of a cooling element, and as a consequence, there is created vapor in the cooling element cycle of the cooling element, which vapor prevents the cooling fluid from flowing through the cooling element in the cooling element cycle, and as a result, the cooling element looses its cooling capacity. The loss of the cooling capacity can finally lead to the destruction of the cooling element in question, and it may be necessary to interrupt the whole process in the metallurgical furnace in order to replace the damaged element. In the solution according to the invention, such weakened cooling elements can be detected in good time, and the flow of the cooling fluid can be increased in order to prevent the formation of a so-called vapor lock.

In addition to technical advantages, the invention also improves cost efficiency. The flow of the cooling fluid can be more accurately focused on the appropriate spots, and therefore the refractory lining structure of the metallurgical furnace wears better, which again results in fewer maintenance interruptions. Because the flow of the cooling fluid can be more accurately focused on the appropriate spots, the measures of the metallurgical furnace can be designed more precisely, i.e. unnecessary sizing allowances can be avoided. And further, because the flow of the cooling fluid can be more accurately focused on the appropriate spots, the solution according to the invention consumes less cooling fluid, which correspondingly results in a reduced cooling need for heated cooling fluid.

The invention is suited in all water-cooled furnaces with element cooling through header units.

LIST OF DRAWINGS

Figure 2:
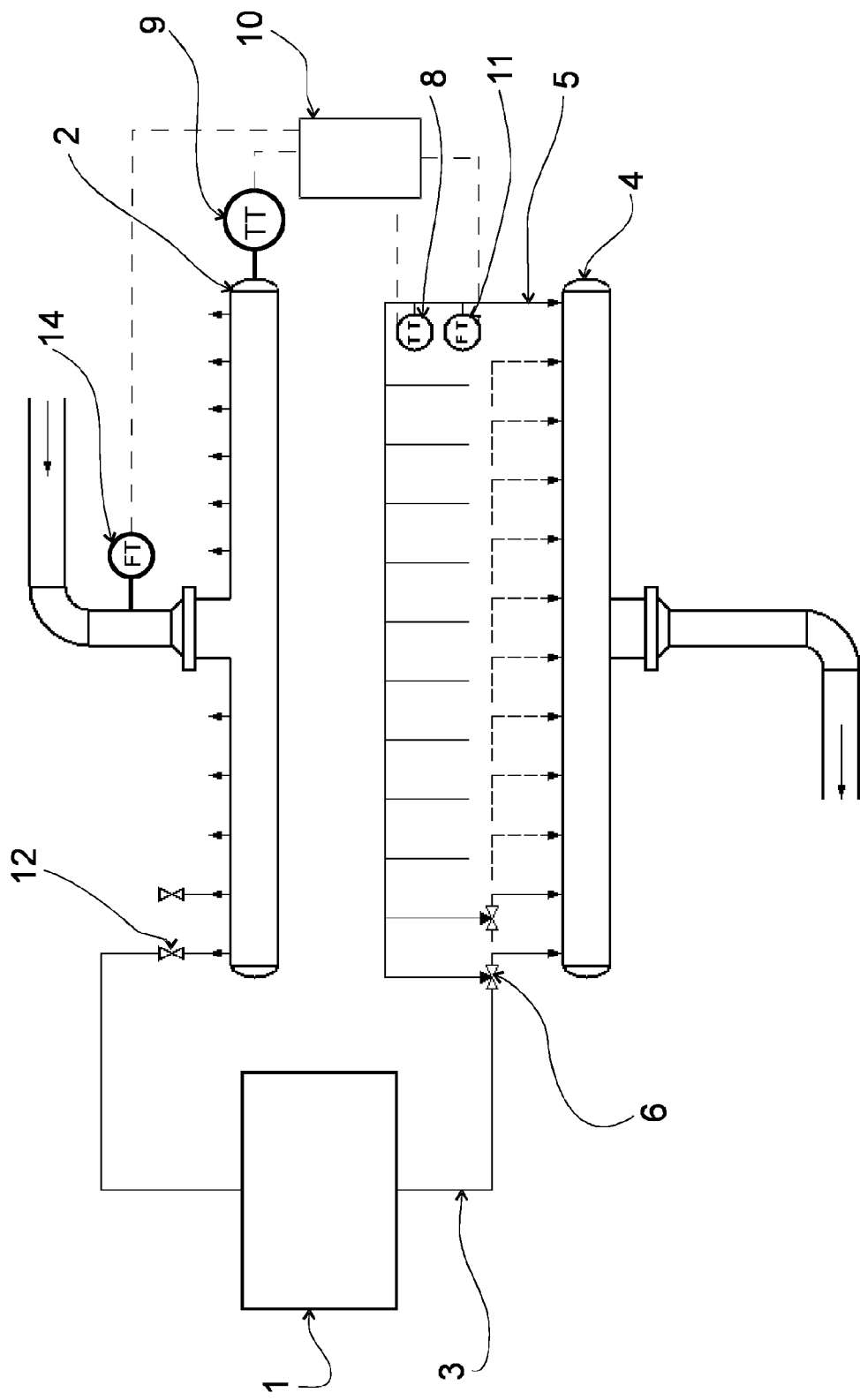

A few preferred embodiments of the invention are described in more detail below, with reference to the appended drawings, where FIG. 1 illustrates a first preferred embodiment of an arrangement according to the invention, and FIG. 2 illustrates another preferred embodiment of an arrangement according to the invention.

DETAILED DESCRIPTION OF THE INVENTION

The drawings illustrate an arrangement for measuring at least one physical magnitude such as temperature, flow or pressure of the cooling fluid flowing in an individual cooling element circuit, of a cooling element 1 in a metallurgical furnace (not illustrated in the drawings).

The arrangement comprises a supply header 2 for distributing and feeding cooling fluid (not illustrated in the drawings) in the cooling element cycles 3 of cooling elements 1. The cooling fluid is for example water.

The arrangement also comprises a collection header 4 for collecting and receiving cooling fluid from the cooling element cycles 3 of the cooling elements 1.

In addition, the arrangement comprises a survey line 5, which is by intermediation of a valve arrangement 6 in fluid connection with at least one cooling element cycle 3, so that cooling fluid is conducted alternatively through the survey line 5 to the collection header 4 or past the survey line 5 to the collection header 4. The valve arrangement 6 can comprise for instance a three-way valve, as is illustrated in the drawings.

The survey line 5 comprises at least one measuring device 7 for measuring at least one physical magnitude of the cooling fluid flowing in the survey line 5, such as the temperature, pressure or flow of the cooling fluid flowing in the survey line 5.

At least one cooling element cycle 3 between the supply header 2 and the collection header 4 is preferably, but not necessarily, provided with a control valve 12 for adjusting the flow of the cooling fluid flowing in the cooling element cycle 3 on the basis on the physical magnitude measured by the measuring device 7.

The valve arrangement 6 is advantageously, but not necessarily, arranged in between the cooling element 1 and the collection header 4, as is illustrated in the drawings.

In the drawings, each cooling element cycle 3 in between the supply header 2 and the collection header 4 is connected by the valve arrangement 6 to the survey line 5, so that the cooling fluid is at each cooling element cycle 3 conducted alternatively through the survey line 5 to the collection header 4 or past the survey line 5 to the collection header 4. Now the arrangement comprises advantageously, but not necessarily, an arrangement for connecting each cooling element cycle 3 in turn in a predetermined order to the survey line 5, so that in a cooling element cycle 3 between a supply header 2 and a collection header 4, the cooling fluid is always being conducted in turn through the survey line 5 to the collection header 4.

In a preferred embodiment, the measuring device 7 comprises a first thermometer 8 for measuring the temperature of the cooling fluid flowing in the survey line 5, and advantageously a temperature indicating arrangement (not illustrated in the drawings) for indicating the temperature of the cooling fluid flowing in the survey line 5. The temperature indicating arrangement can be arranged for example in the process monitoring room (not illustrated in the drawings).

In addition to the first thermometer 8 described in the preferred embodiment illustrated in FIG. 2, the arrangement also includes a second thermometer 9 for measuring the temperature of the cooling fluid prior to the cooling element cycle 3, and calculation means 10 for calculating the temperature difference in the cooling element cycle 3 between the temperature measured by the first thermometer 8 and the temperature measured by the second thermometer 9, and advantageously an indicating arrangement (not illustrated in the drawings) for indicating the heat loss in the cooling element cycle 3 calculated by the calculation means 10. The indicating arrangement can be arranged for example in the process monitoring room (not illustrated in the drawings).

In the preferred embodiment illustrated in FIG. 2, the measuring device 7 includes, in addition to the above described first thermometer 8, a first flow meter 11 for measuring the flow of the cooling fluid flowing in the survey line 5. The first flow meter 11 can measure for instance the mass flow, volume flow or flow rate of the cooling fluid flowing in the survey line 5. In this preferred embodiment, the arrangement comprises a second thermometer 9 for measuring the temperature of the cooling fluid prior to the cooling element cycle 3. The second thermometer 9 can alternatively be arranged to measure the temperature of the cooling fluid before the cooling fluid enters in the cooling system, i.e. in the header unit, for instance in the main line of a so-called metallurgical furnace (not illustrated in the drawings), before the cooling fluid is distributed in the header units of the metallurgical furnace. In the preferred embodiment illustrated in FIG. 2, the arrangement also comprises calculation means 10, first of all for calculating the temperature difference between the temperature measured by the first thermometer 8 and the temperature measured by the second thermometer 9, and secondly for calculating the heat loss in the cooling element cycle 3 on the basis of the calculated temperature difference in the cooling element cycle 3 and the flow.

In case the survey line 5 comprises a first thermometer 8 for measuring the temperature of the cooling fluid flowing in the survey line 5, the arrangement may include, as an alternative, advantageously but not necessarily, a first comparison arrangement (not illustrated in the drawings) for comparing the measured temperature with a predetermined maximum value. Now the arrangement comprises advantageously, but not necessarily, an alarm arrangement (not illustrated in the drawings) for giving an alarm in case the measured temperature surpasses a predetermined maximum value. Said first comparison arrangement is advantageously, but not necessarily, arranged to calculate the heat loss in the cooling element cycle 3 from the cooling fluid temperature measured by the first thermometer 8, and from a predetermined maximum value of the temperature, or from a predetermined target value of the pressure.

At least one cooling element cycle 3 between the supply header 2 and the collection header 4 is advantageously, but not necessarily, provided with a control valve 12 for adjusting the flow of the cooling fluid flowing in the cooling element cycle 3 on the basis of the temperature measured by the first thermometer 8 of the measuring device 7, for instance by increasing the flow, in case the cooling fluid temperature measured by the first thermometer 8 rises.

The measuring device 7 comprises advantageously, but not necessarily, a pressure indicator 13 for measuring the pressure of the cooling fluid flowing in the survey line 5, and a pressure indicating arrangement (not illustrated in the drawings) for indicating the pressure of the cooling fluid flowing in the survey line 5.

In case the survey line 5 comprises a pressure indicator 13 for measuring the pressure of the cooling fluid flowing in the survey line 5, the arrangement includes advantageously, but not necessarily, a second comparison arrangement (not illustrated in the drawings) for comparing the measured pressure with a predetermined minimum value. Now the arrangement includes advantageously, but not necessarily, an alarm arrangement (not illustrated in the drawings) for giving an alarm in case the measured pressure falls below a predetermined minimum value. Said second comparison arrangement is advantageously, but not necessarily, arranged to calculate the pressure loss in the cooling element cycle 3 from the flow measured by the pressure indicator 13, and from a predetermined minimum value or a predetermined target value of the pressure.

At least one cooling element cycle 3 between the supply header 2 and the collection header 4 is advantageously, but not necessarily, provided with a control valve 12 for adjusting the flow of the cooling fluid flowing in the cooling element cycle 3 on the basis of the pressure measured by the pressure indicator 13 of the measuring device 7, for example by increasing flow, in case the pressure of the cooling fluid measured by the pressure indicator 13 is reduced.

The measuring device 7 comprises advantageously, but not necessarily, a first flow meter 11 for measuring the flow of the cooling fluid flowing in the survey line 5.

In case the survey line 5 comprises a first flow meter 11 for measuring the flow of the cooling fluid flowing in the survey line 5, the arrangement includes advantageously, but not necessarily, a third comparison arrangement (not illustrated in the drawings) for comparing the measured flow with a predetermined minimum value. Now the arrangement includes advantageously, but not necessarily, an alarm arrangement (not illustrated in the drawings) for giving an alarm in case the measured flow falls below a predetermined minimum value. Said third comparison arrangement is advantageously, but not necessarily, arranged to calculate the flow loss of the cooling element cycle 3 from the flow measured by the flow meter 11, and from a predetermined minimum value of the flow or from a predetermined target value of the flow.

At least one cooling element cycle 3 between the supply header 2 and the collection header 4 is advantageously, but not necessarily, provided with a control valve 12 for adjusting the flow of the cooling fluid flowing in the cooling element cycle 3 on the basis of the flow measured by the first flow meter 11 of the measuring device 7, for example by increasing flow, in case the flow of the cooling fluid measured by the first flow meter 11 is reduced.

The invention also relates to a method for measuring at least one physical magnitude such as temperature, flow or pressure of the cooling fluid flowing in an individual cooling element cycle 3 of a cooling element 1 in a metallurgical furnace (not illustrated in the drawings).

In the method, cooling fluid is fed to the supply header 2 for distributing the cooling fluid and for feeding it to the cooling element cycles 3 of the cooling elements 1.

In the method, cooling fluid is fed from the supply header 2 to the cooling element cycles 3 of the cooling elements.

In the method, cooling fluid is received from cooling element cycles 3 of the cooling elements 1 by a collection header 4 for collecting and receiving cooling fluid from the cooling element cycles 3 of the cooling elements 1.

In the method, there is arranged a survey line 5.

The survey line 5 is connected to the collection header 4.

The survey line 5 is connected by a valve arrangement 6 to at least one cooling element cycle 3, so that the cooling fluid is conducted alternatively either through the survey line 5 to the collection header 4 or past the survey line 5 to the collection header 4.

In the survey line 5, there is arranged at least one measuring device 7 for measuring at least one physical magnitude, such as temperature, pressure, or flow of the cooling fluid flowing in the survey line 5.

Cooling fluid is conducted through the survey line 5 to the collection header 4.

At least one physical magnitude of the cooling fluid is measured in the survey line 5, and there is obtained the value of the physical magnitude and the loss is estimated.

The survey line 5 is connected advantageously, but not necessarily, by a valve arrangement 6 to each cooling element cycle 3 so that cooling fluid is in each cooling element cycle 3 conducted alternatively through the survey line 5 to the collection header 4 or past the survey line 5 to the collection header 4.

In a preferred embodiment of the method, the supply header 2 is provided with a second thermometer 9 for measuring the initial temperature of the cooling fluid flowing in the supply header 2. A second thermometer can be arranged in the supply header 2 or prior to the supply header, i.e. prior to the header unit, for instance in the main line of the cooling system of a so-called metallurgical furnace (not illustrated in the drawings) prior to distributing the cooling fluid in the header units of the metallurgical furnace. In this embodiment, there is arranged a measuring device 7 in the form of a first thermometer 8 in the survey line 5 for measuring the end temperature of the cooling fluid flowing in the survey line 5. In this embodiment, the initial temperature of the cooling fluid is measured by a second thermometer 9 in the supply header 2, and the end temperature of the cooling fluid is measured in the survey line 5 by the first thermometer 8. In this embodiment, there is calculated the temperature difference between the initial temperature of the cooling fluid measured in the supply header 2, and the end temperature of the cooling fluid measured in the survey line 5, and thus the temperature difference of the cooling element cycle 3 is obtained. In this preferred embodiment of the method, the measuring device 7 comprises a first flow meter 11 for measuring the flow of the cooling fluid flowing in the survey line 5; the flow of the cooling fluid in the survey line 5 is measured, and the thermal stress or load is calculated on the basis of the calculated temperature difference in the cooling element cycle 3 and the measured flow in the survey line.

In a preferred embodiment of the method, in the survey line 5 there is arranged a measuring device 7 comprising a first thermometer 8 for measuring the temperature of the cooling fluid flowing in the survey line 5, and the end temperature of the cooling fluid in the survey line 5 is measured. In this embodiment, the temperature of the cooling fluid measured in the survey line 5 is compared with a predetermined maximum value, and there is advantageously, but not necessarily, given an alarm in case the cooling fluid temperature in the survey line 5 surpasses a predetermined maximum value. In this embodiment, there is advantageously, but not necessarily, calculated the heat loss of the cooling element cycle 3 from a predetermined maximum value or from a predetermined target value, and from the temperature of the cooling fluid flowing in the survey line 5 measured by the first thermometer 8, for instance by calculating the temperature difference between a predetermined maximum value or a predetermined target value and the temperature of the cooling fluid measured by the first thermometer 8.

In a preferred embodiment of the method, the survey line 5 is provided with a measuring device 7 comprising a pressure indicator 13 for measuring the pressure of the cooling fluid flowing in the survey line 5, and the pressure of the cooling fluid in the survey line 5 is measured. In this embodiment, the pressure of the cooling fluid in the survey line 5 is compared with a predetermined minimum value, and there is advantageously, but not necessarily, given an alarm in case the pressure of the cooling fluid in the survey line 5 falls below a predetermined minimum value. In this embodiment, there is advantageously, but not necessarily, calculated the pressure loss of the cooling element cycle 3 from a predetermined minimum value or from a predetermined target value, and from the cooling fluid flowing in the survey line 5 measured by the pressure indicator 13, for instance by calculating the difference of a predetermined minimum value or a predetermined target value and the pressure of the cooling fluid measured by the pressure indicator 13.

In a preferred embodiment of the method, in the survey line 5 there is arranged a first flow meter 11 for measuring the flow of the cooling fluid flowing in the survey line 5. In this embodiment, the cooling fluid flow in the survey line 5 is measured, and the cooling fluid flow in the survey line 5 is compared with a predetermined minimum value, and there is advantageously, but not necessarily, given an alarm in case the cooling fluid flow in the survey line 5 falls below a predetermined minimum value. In this embodiment, there is advantageously, but not necessarily, calculated the flow loss of the cooling element cycle 3 from a predetermined minimum value or from a predetermined target value, and from the flow of the cooling fluid flowing in the survey line 5 measured by the first flow meter 11, for instance by calculating the difference between a predetermined minimum value or a predetermined target value, and the cooling fluid flow measured by the first flow meter 11.

In a preferred embodiment of the method, the supply header 2 is provided with a second flow meter 14 for measuring the flow of the cooling fluid flowing in the supply header. In this embodiment, in the survey line 5 there is arranged a first flow meter 11 for measuring the flow of the cooling fluid flowing in the survey line 5. In this embodiment, the flow in each cooling element cycle 3 is measured, and the end flows of the cooling fluid in each cooling element cycle 3 are summed up, and as a result, there is obtained the total return flow, and the flow difference between the total return flow and the flow fed in the supply header 2 is calculated, and there is obtained the flow loss. The flow loss should be zero, because if there is flow loss, the system has a leakage.

In a preferred embodiment of the method the survey line 5 is connected by a valve arrangement 6 to each cooling element cycle 3, so that cooling fluid in each cooling element cycle 3 is conductable alternatively either through the survey line 5 to the collection header 4 or past the survey line 5 to the collection header 4. In this preferred embodiment the supply header 2 is provided with a second flow meter 14 for measuring the flow of the cooling fluid flowing in the supply header 2. In this preferred embodiment there is arranged a first flow meter 11 for measuring the flow of the cooling fluid flowing in the survey line 5. In this preferred embodiment the cooling fluid flows in the supply header 2 are measured by means of the second flow meter 14 provided in the supply header 2. In this preferred embodiment cooling fluid is in turn conducted from each cooling element cycle 3 through the survey line 5 to the collection header 4 and the flow of cooling fluid is measured in each cooling element cycle 3 by means of the first flow meter 11 arranged in the survey line 5. In this preferred embodiment the cooling fluid flows measured for each cooling element cycle 3 are summed up, and as a result, there is obtained the total return flow. In this preferred embodiment here is calculated the difference of the total return flow and the flow fed in the supply header 2, and there is obtained the flow loss. The flow loss should be zero, because if there is flow loss, the system has a leakage.

For a man skilled in the art, it is obvious that along with the developments in technology, the principal idea of the invention can be realized in many different ways. Thus the inven-

The invention claimed is:

1. A method for measuring at least one physical magnitude of cooling fluid flowing in an individual cooling element circuit of a cooling element in a metallurgical furnace having a plurality of cooling elements provided with respective cooling element circuits, the method comprising:
feeding cooling fluid to a supply header for distributing cooling fluid and for feeding it to the cooling element circuits of the cooling elements,
feeding cooling fluid from the supply header to the cooling element circuits of the cooling elements,
selectively conducting cooling fluid from the cooling element circuit of each cooling element to a collection header alternatively either through a survey line or by-passing the survey line,
receiving cooling fluid from the cooling element circuits of the cooling elements at the collection header for collecting cooling fluid from the cooling element circuits of the cooling elements,
measuring flow of the cooling fluid flowing in the supply header,
sequentially conducting cooling fluid from the cooling element circuit of each cooling element in turn to the collection header through the survey line,
measuring the flows of cooling fluid flowing in the survey line,
summing the measured flows of cooling fluid in the survey line, to provide a total return flow, and
calculating a difference between the total return flow and the measured flow of the cooling fluid flowing in the supply header, to provide a flow loss.

2. A method according to claim 1, comprising employing at least one measuring device connected to the survey line to measure said at least one physical magnitude and to output a measured value of said at least one physical magnitude.

3. A method according to claim 1, comprising:
measuring a temperature of the cooling fluid flowing in the survey line,
comparing the measured temperature with a predetermined maximum temperature value, and
giving an alarm in case the measured cooling fluid temperature in the survey line exceeds the predetermined maximum temperature value.

4. A method according to claim 1, comprising
measuring a pressure of the cooling fluid flowing in the survey line,
comparing the measured pressure with a predetermined minimum pressure value, and
giving an alarm in case the measured cooling fluid pressure in the survey line falls below the predetermined minimum pressure value.

5. A method according to claim 1, comprising
measuring a flow of the cooling fluid flowing in the survey line,
comparing the measured flow with a predetermined minimum flow value, and
giving an alarm in case the measured cooling fluid flow in the survey line falls below the predetermined minimum flow value.

6. A method according to claim 1, comprising selectively conducting cooling fluid from the cooling element circuit of each cooling element to the collection header alternatively either through the survey line or by-passing the survey line.

7. A method according to claim 6, comprising sequentially conducting cooling fluid from each individual cooling element circuit through the survey line to the collection header, for measuring at least one physical magnitude of the cooling fluid flowing in each individual cooling element circuit.

8. A method according to claim 1, comprising:
employing a first thermometer for measuring an initial temperature of the cooling fluid flowing in the supply header,
employing a second thermometer for measuring an end temperature of the cooling fluid flowing in the survey line, and
calculating a difference between the initial temperature and the end temperature,
whereby the calculated temperature difference is a temperature difference over the cooling element circuit.

9. A method according to claim 8, comprising:
measuring flow of the cooling fluid flowing in the survey line, and
calculating a thermal load of the cooling element circuit from the calculated temperature difference and the measured cooling fluid flow.

10. An arrangement for measuring at least one physical magnitude of cooling fluid flowing in an individual cooling element circuit of a cooling element in a metallurgical furnace having a plurality of cooling elements provided with respective cooling element circuits, said arrangement comprising:
a supply header for distributing the cooling fluid and for feeding it to the cooling element circuits of the cooling elements, and
a collection header for collecting and receiving cooling fluid from the cooling element circuits of the cooling elements,
a survey line which is in fluid connection with the collection header,
a valve arrangement for selectively connecting at least one cooling element circuit with the survey line, so that the cooling fluid is conducted to the collection header alternatively through the survey line or by-passing the survey line,
a first thermometer for measuring temperature of cooling fluid flowing in the survey line,
a second thermometer for measuring temperature of the cooling fluid upstream of the cooling element circuit, and
a calculation means for calculating difference between the temperature measured by the first thermometer and the temperature measured by the second thermometer.

11. An arrangement according to claim 10, wherein the valve arrangement is located between the cooling element and the collection header.

12. An arrangement according to claim 10, wherein at least one cooling element circuit is provided with a control valve for adjusting the flow of the cooling fluid flowing in the cooling element circuit on the basis of the physical magnitude temperature measured by the first thermometer.

13. An arrangement according to claim 10, comprising a flow meter for measuring the flow of the cooling fluid flowing in the survey line and a calculation means for calculating a thermal load on the basis of the calculated temperature difference and the measured cooling fluid flow.

14. An arrangement according to claim 10, wherein the valve arrangement comprises a plurality of valves for selectively connecting the cooling element circuits respectively to the survey line, so that cooling fluid in each cooling element circuit is conducted to the collection header alternatively through the survey line or by-passing the survey line.

15. An arrangement according to claim 14, comprising an arrangement for controlling the valves, in order to connect each cooling element circuit in turn to the survey line in a predetermined order, so that at all times the cooling fluid in one of the cooling element circuits is being conducted through the survey line to the collection header.

16. An arrangement according to claim 10, comprising a pressure indicator for measuring pressure of the cooling fluid flowing in the survey line.

17. An arrangement according to claim 16, wherein at least one cooling element circuit is provided with a control valve for adjusting flow of the cooling fluid flowing in the cooling element circuit on the basis of the pressure measured by the pressure indicator.

18. An arrangement according to claim 10, comprising a flow meter for measuring the flow of the cooling fluid flowing in the survey line.

19. An arrangement according to claim 18, wherein at least one cooling element circuit is provided with a control valve for adjusting flow of the cooling fluid flowing in the cooling element circuit on the basis of the flow measured by said flow meter.

20. A method for measuring at least one physical magnitude of cooling fluid flowing in an individual cooling element circuit of a cooling element in a metallurgical furnace having a plurality of cooling elements provided with respective cooling element circuits, the method comprising:
feeding cooling fluid to a supply header for distributing cooling fluid and for feeding it to the cooling element circuits of the cooling elements,
feeding cooling fluid from the supply header to the cooling element circuits of the cooling elements,
conducting cooling fluid from the cooling element circuit of at least one cooling element to a collection header alternatively either through a survey line or by-passing the survey line,
receiving cooling fluid from the cooling element circuits of the cooling elements at the collection header for collecting cooling fluid from the cooling element circuits of the cooling elements,
employing a first thermometer for measuring an initial temperature of the cooling fluid flowing in the supply header,
employing a second thermometer for measuring an end temperature of the cooling fluid flowing in the survey line, and
calculating a difference between the initial temperature and the end temperature,
whereby the calculated temperature difference is a temperature difference over the cooling element circuit.

21. A method according to claim 20, comprising:
measuring flow of the cooling fluid flowing in the survey line, and
calculating a thermal load of the cooling element circuit from the calculated temperature difference and the measured cooling fluid flow.

22. A method according to claim 20, comprising:
comparing the end temperature measured by the second thermometer with a predetermined maximum temperature value, and
giving an alarm in case the measured end temperature of cooling fluid flowing in the survey line exceeds the predetermined maximum temperature value.

23. A method according to claim 20, comprising
measuring a pressure of the cooling fluid flowing in the survey line,
comparing the measured pressure with a predetermined minimum pressure value, and
giving an alarm in case the measured cooling fluid pressure in the survey line falls below the predetermined minimum pressure value.

24. A method according to claim 20, comprising
measuring a flow of the cooling fluid flowing in the survey line,
comparing the measured flow with a predetermined minimum flow value, and
giving an alarm in case the measured cooling fluid flow in the survey line falls below the predetermined minimum flow value.

25. A method according to claim 20, comprising selectively conducting cooling fluid from the cooling element circuit of each cooling element to the collection header alternatively either through the survey line or by-passing the survey line.

26. A method according to claim 25, comprising sequentially conducting cooling fluid from each individual cooling element circuit through the survey line to the collection header, for measuring an end temperature of the cooling fluid flowing in each individual cooling element circuit.

* * * * *